(12) United States Patent
Konomoto

(10) Patent No.: US 6,385,917 B1
(45) Date of Patent: May 14, 2002

(54) BASE ISOLATION DEVICE WITH DAMPING MECHANISM

(75) Inventor: Masashi Konomoto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/661,800

(22) Filed: Sep. 14, 2000

(30) Foreign Application Priority Data

Sep. 14, 1999  (JP) ............................................ 11-260215

(51) Int. Cl.⁷ .............................. E04B 1/98; E04H 9/00
(52) U.S. Cl. .................... 52/167.6; 52/167.1; 52/167.2; 52/167.5
(58) Field of Search ............................. 52/167.1, 167.2, 52/167.5, 167.6

(56) References Cited

U.S. PATENT DOCUMENTS

| | | | |
|---|---|---|---|
| 4,596,373 A | * | 6/1986 | Omi et al. .................. 248/562 |
| 5,273,381 A | | 12/1993 | Shirai |
| 5,918,339 A | * | 7/1999 | Marioni et al. ......... 52/167.1 X |
| 5,970,666 A | * | 10/1999 | Kurabayashi et al. ......... 52/167.6 |
| 6,085,473 A | * | 7/2000 | Teramachi et al. .......... 52/167.5 |
| 6,092,780 A | * | 7/2000 | Kurabayashi et al. ........ 248/636 |
| 6,230,450 B1 | * | 5/2001 | Kuroda et al. .............. 52/167.8 |

FOREIGN PATENT DOCUMENTS

| | | | |
|---|---|---|---|
| JP | 403169984 | * | 7/1991 ................. 52/167.5 |
| JP | 10-184786 | | 7/1998 |

OTHER PUBLICATIONS

Abstract of Japanese Patent Publ. No. 58124843A; dated Jul. 25, 1983.
Abstract of Japanese Patent Publ. No. 08–240033; dated Sep. 17, 1996.
Abstract of Japanese Patent Publ. No. 10–184757; dated Jul. 14, 1998.

* cited by examiner

Primary Examiner—Carl D. Friedman
Assistant Examiner—Brian E. Glessner
(74) Attorney, Agent, or Firm—Arent Fox Kintner Plotkin & Kahn, PLLC

(57) ABSTRACT

A base isolation device used for the purpose of absorbing a quake of the ground by, for example, an earthquake to thereby reduce the quake of a building, or used for the purpose of reducing a quake applied to a precision machinery and tool in transportation etc. of the precision machinery and tool. The base isolation device comprises 1st and 2nd track rails disposed orthogonally to each other, a 1st slide member freely linearly movable along the 1st track rail, a 2nd slide member connected to the 1st slide member and freely linearly movable along the 2nd track rail, a ball screw for converting a linear motion of the 2nd slide member into a rotary motion, a rotary sleeve to which a rotation is given by the ball screw, a stationary sleeve forming an action chamber of damping force between it and an outer periphery face of the rotary sleeve, and a viscous fluid sealed in the action chamber.

7 Claims, 13 Drawing Sheets

F I G. 5
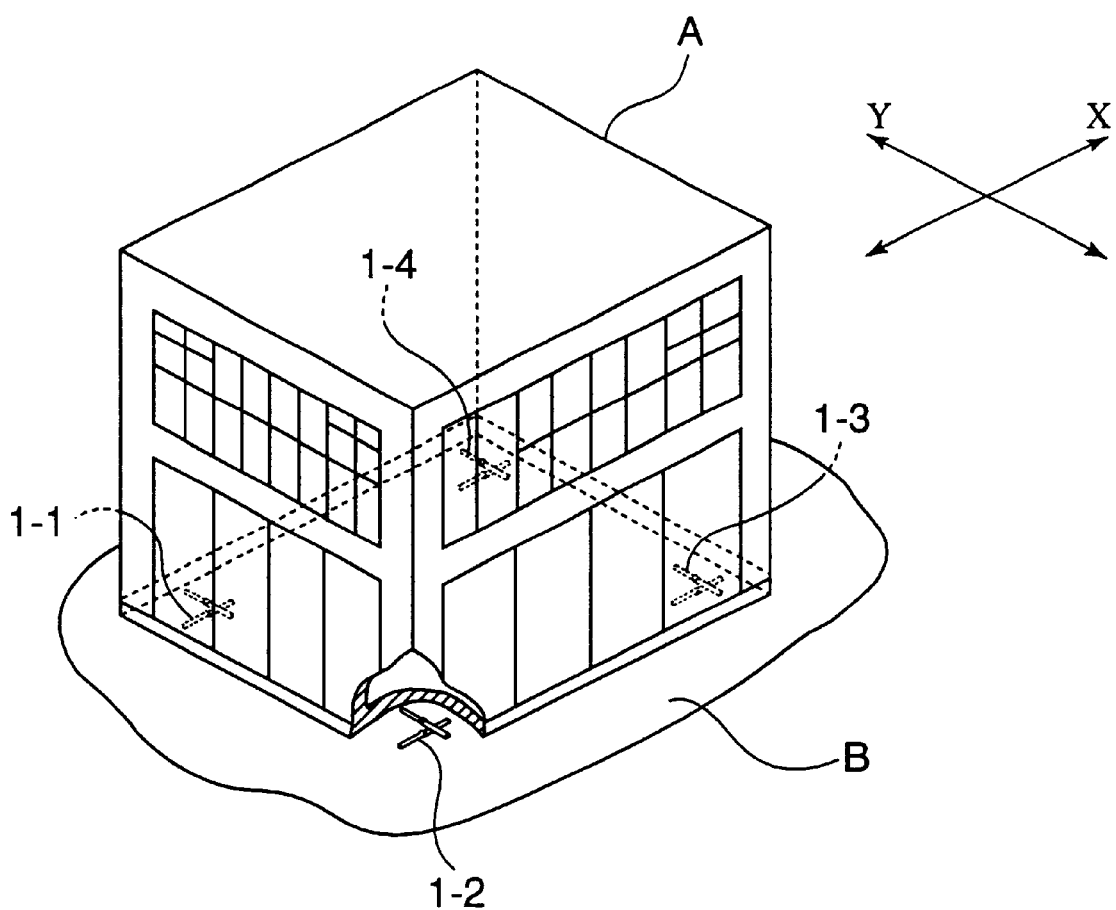

F I G. 7
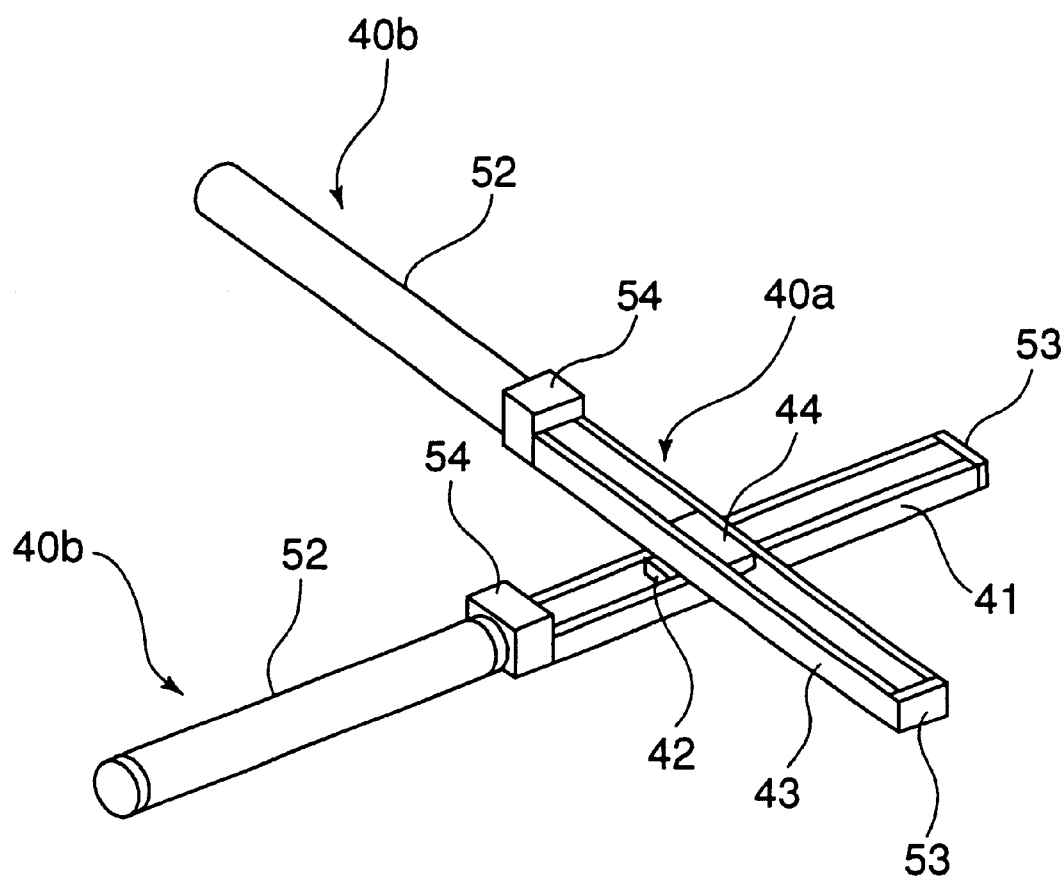

BASE ISOLATION DEVICE WITH DAMPING MECHANISM

BACKGROUND OF THE INVENTION

1. Field of the Invention

The present invention relates to a base isolation device used for the purpose of absorbing a quake of the ground by, for example, an earthquake to thereby reduce the quake of a building, or used for the purpose of reducing a quake applied to a precision machinery and tool in transportation etc. of the precision machinery and tool.

2. Description of the Related Art

Hitherto, as an earthquake countermeasure for real estates such as buildings and houses, or as a vibration countermeasure when carrying the precision machine and tool, a case of art work, and the like, there has been used a base isolation device for absorbing the vibration of the ground or a floor to thereby reduce it. As this base isolation device, there have been hitherto known one of a type in which rubber plates are laminated between a basement such as the ground and a structure body such as a construction object, one in which low friction slide faces consisting of fluororesin etc. are formed between the basement and the structure body, and the like.

However, in recent years, as a new base isolation device, there is proposed a base isolation device utilizing linear guide units used in a work table etc. of machine tool (Japanese Patent Laid-Open No. 240033/1996 Gazette). As shown in FIG. 14, this base isolation device comprises 1st and 2nd track rails 102, 103 in which rolling faces for rolling bodies such as balls are formed along longitudinal directions and which are fixed so as to be mutually orthogonal to a basement 100 and a structure body 101 respectively, a 1st slide member 104 incorporated to the 1st track rail 102 through many rolling bodies and freely linearly movable in reciprocation along the 1st track rail 102, and a second slide member 105 fixed to the 1st slide member 104, incorporated to the 2nd track rail 103 through many rolling bodies and freely linearly movable in reciprocation along the 2nd track rail 103, and it is adapted such that, if the basement 100 quakes by the earthquake and the like, the track rails 102, 103 and the slide members 104, 105 incorporated to the formers perform relative linear reciprocation motions.

FIG. 15 is a schematic view in case where a concrete use method of this base isolation device is seen from above. On the basement 100, the base isolation devices mentioned above are used in four places, and the 1st track rail 102 of each base isolation device is fixed to the basement 100 along an X-direction. On the other hand, the 2nd track rail 103 is fixed to the structure body (not shown) along a Y-direction orthogonal to the 1st track rail 102. Since a dynamic frictional coefficient between the track rails 102, 103 and the slide members 104, 105 is very small, if the basement 100 quakes in a horizontal direction by the earthquake and the like, the slide members 104, 105 of each base isolation device move on the track rails 102, 103 along the X-direction or the Y-direction to absorb the quake. That is, the structure body provided on the base isolation devices is insulated from the quake of the basement 100 and becomes such a state that as if it floats in the air. It is considered that the structure body violently quakes by the earthquake and the like because a period of the quake of the basement agrees with that of the quake of the structure body, thereby generating a resonance phenomena. However, in case where the structure body is insulated from the basement by the base isolation devices in this manner, since it is possible to avoid a generation of the resonance by setting the period of the quake of the structure body sufficiently large, it becomes possible to reduce the quake of the structure body.

On the other hand, although this base isolation device prevents the resonance between the basement and the structure body, since it is not one capable of completely preventing the quake of the structure body and, moreover, since it is one insulating the quake of the basement from that of the structure body as mentioned above, it follows that the quake remains after the earthquake for instance has quieted down. Therefore, when supporting the structure body by using such base isolation devices, as shown in FIG. 15 it has been necessary to provide damping units 106 between the basement 100 and the structure body separately from the base isolation devices to thereby absorb an energy of the quake of the structure body such that the quake quits down in short time. Hitherto, as such a damping unit, there have been known one adapted such that the basement and the structure body are connected by a rubber cylinder body formed by means of laminating alternately rubber plates and reinforcing plates, and a quake energy of the structure body is converted into a thermal energy accompanying with a shearing deformation of the rubber cylinder body, thereby absorbing the quake energy, and the like.

However, with this damping unit, since a shearing deformation amount of the rubber cylinder body connecting the basement and the structure body cannot be set large, it becomes a result that the damping unit limits movements in XY-directions in the base isolation device. Accordingly, in case where the above damping unit is used in combination with the base isolation device utilizing linear guide units, it becomes impossible to completely insulate the structure body from the basement, so that it becomes impossible to sufficiently absorb the quake of the basement by the base isolation device. Further, if the damping unit is provided separately from the base isolation device, there has been such a problem that an excessive labor is required correspondingly, and a work for providing the structure body on the basement in the base isolation device becomes complex.

SUMMARY OF THE INVENTION

The invention was made in view of such a problem, and its object is to provide a base isolation device with damping mechanism, which can effectively absorb a quake of a basement by insulating a structure body from the basement, and can intend to simplify an attaching work to the basement and the structure body.

That is, the invention is a base isolation device with damping mechanism, which is disposed between a basement and a structure body arranged on the basement and suppresses a transmission of a quake from the basement to the structure body, characterized by comprising: 1st and 2nd track rails formed with ball rolling faces along a longitudinal direction and disposed orthogonally to each other; a 1st slide member incorporated to the 1st track rail through many balls and freely linearly movable in reciprocation along the 1st track rail; a 2nd slide member connected to either of the 1st track rail or the 1st slide member, incorporated to the 2nd track rail through many balls and freely linearly movable in reciprocation along the 2nd track rail; motion conversion means which has a rotation transmission body arranged such that its axis agrees with a moving direction of the 1st slide member or the 2nd slide member, and converts a linear reciprocation motion of the slide member into a normal/reverse rotary motion of the rotation transmission body; a rotary sleeve connected to the rotation transmission body; a stationary sleeve accommodating the rotary sleeve and forming an action chamber of damping force between it and the rotary sleeve; and a viscous fluid sealed in the action chamber.

The base isolation device of the invention constituted in this manner is used under a state that, for example, the 1st track rail is fixed to the basement, while the structure body is fixed to the 2nd track rail orthogonal to the 1st track rail, and the 1st slide member and the 2nd slide member moving along the 1st and 2nd track rails are mutually fixed. On this occasion, the motion conversion means for converting the linear reciprocation motion of the slide member into the normal/reverse rotary motion, for example a ball screw unit, is connected to the 1st slide member or the 2nd slide member and, if the 1st slide member or the 2nd slide member is moved on the track rail with a quake of the basement, the rotation transmission body provided in the motion conversion means is rotated and, further, the rotary sleeve connected to the rotation transmission body is rotated. The rotary sleeve is accommodated in the stationary sleeve to thereby form the action chamber, and the viscous fluid is sealed in the action chamber. Accordingly if the rotary sleeve is rotated, a shearing frictional force is applied to the viscous fluid in the action chamber, so that a kinetic energy of the rotary sleeve is consumed as a thermal energy of the viscous fluid. In other words, it follows that an energy of the linear reciprocation motion of the slide member is consumed by the viscous fluid as the thermal energy, so that it is possible to reduce the motion of the slide member with respect to the track rail and, in turn, the motion of the structure body with respect to the basement.

Here, since the motion conversion means connected to the slide member merely converts the linear reciprocation motion into the rotary motion, it does not limit the motion of the slide member at all, so that the base isolation device of the invention can effectively absorb the quake of the basement. Further, since the rotary sleeve functioning as a damping unit is directly fixed to the slide member through the motion conversion means, when providing the structure body to the basement, it is unnecessary to provide the damping unit separately from the base isolation device, so that a work for arranging the structure body can be simplified correspondingly.

BRIEF DESCRIPTION OF THE DRAWINGS

FIG. 5 is a perspective view showing an example in which a structure body is supported on a basement by using the base isolation devices of the invention;

FIG. 7 is a perspective view showing a 3rd embodiment of the base isolation device to which the invention was applied;

DESCRIPTION OF THE PREFERRED EMBODIMENTS

Hereunder, a base isolation device with damping mechanism of the invention is detailedly explained on the basis of the attached drawings.

Figure 1:
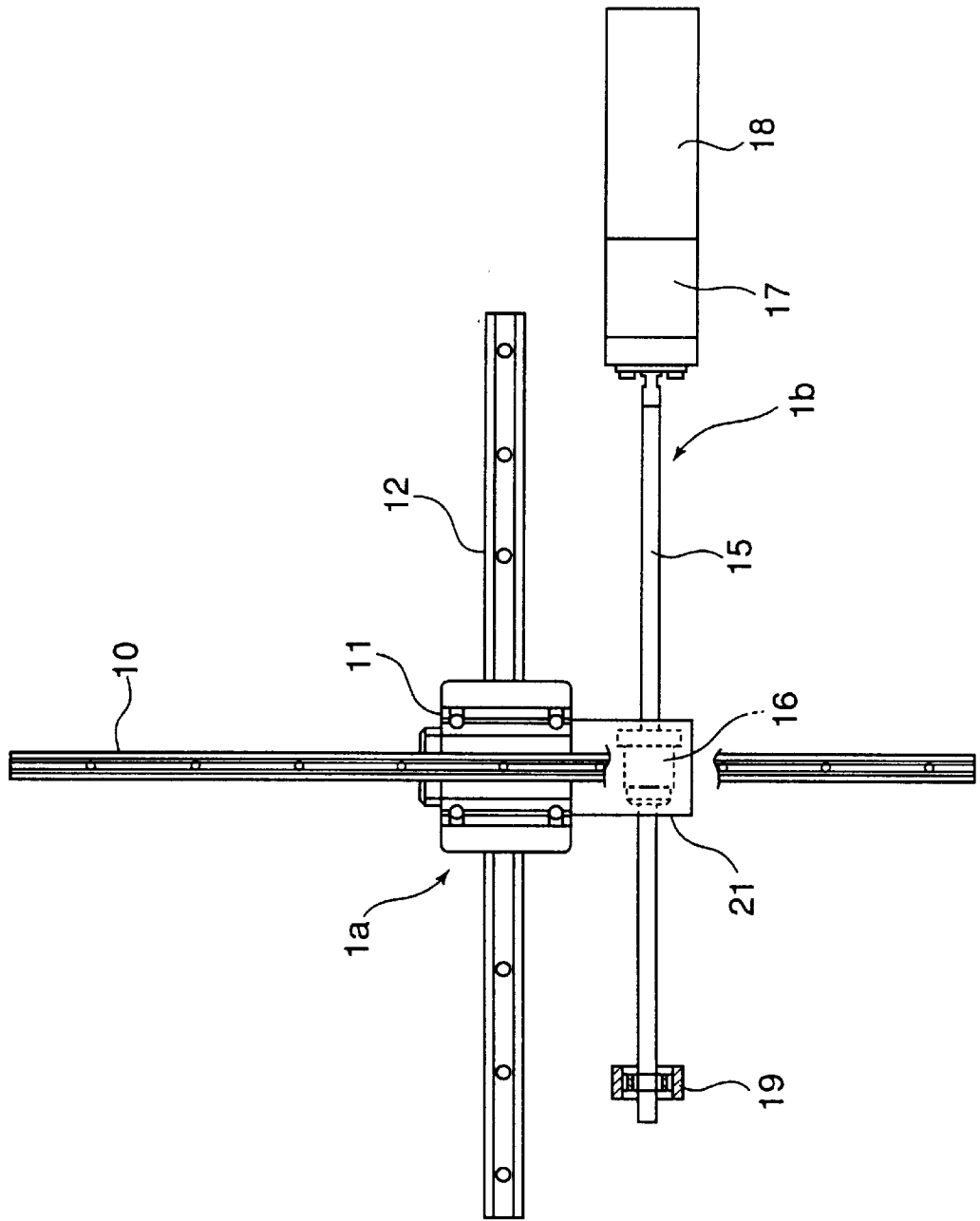
FIG. 1 is a plan view showing a first embodiment of a base isolation device to which the invention was applied.

FIG. 1 shows a 1st embodiment of the base isolation device with damping mechanism to which the invention was applied. This base isolation device 1 comprise a support guide section 1a provided between a structure body such as construction object and a basement such as foundation and supporting the structure body while resisting against its load, and a damping section 1b for suppressing a quake of the structure body supported by the support guide section 1a.

Figure 2:
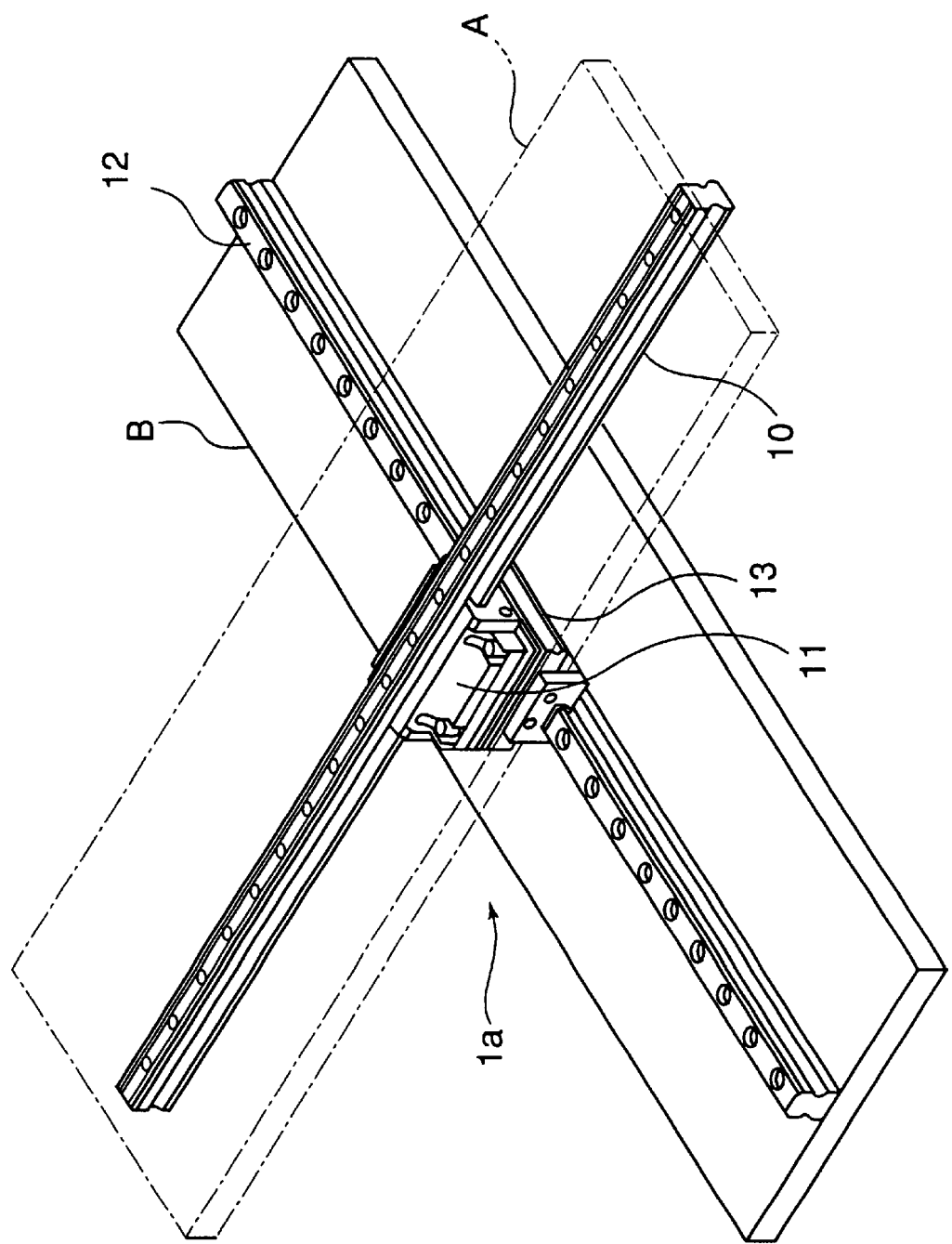
FIG. 2 is a perspective view showing a support guide section of the base isolation device according to the 1st embodiment.

FIG. 2 is a perspective view showing a constitution of the support guide section. The support guide section 1a comprises a 1st track rail 10 fixed to a structure body A, a 1st slide member 11 incorporated to the 1st track rail 10, a 2nd track rail 12 fixed to a basement B such as foundation so as to be orthogonal to the 1st track rail 10, and a 2nd slide member 13 incorporated to the 2nd track rail 12 and fixed to the 1st slide member 11. In each track rail, plural ball rolling grooves are formed in a longitudinal direction, while in each of the slide members 11, 13 there are accommodated many balls rolling on the ball rolling grooves, and thus it is adapted such that the slide members 11, 13 are freely movable respectively on the track rails 10, 12 with a very small dynamic frictional resistance by rolling of the balls. The 1st slide member 11 and the 2nd slide member 13 are completely the same members, and they are fixed back to back through a bracket. And, since the 1st track rail 10 and the 2nd track rail 12 are provided orthogonally to each other, if the 1st slide member 11 is moved along the 1st track rail 10 and the 2nd slide member 13 is moved along the 2nd track rail 12, it follows that the structure body A is two-dimensionally moved on the basement B.

Figure 3:
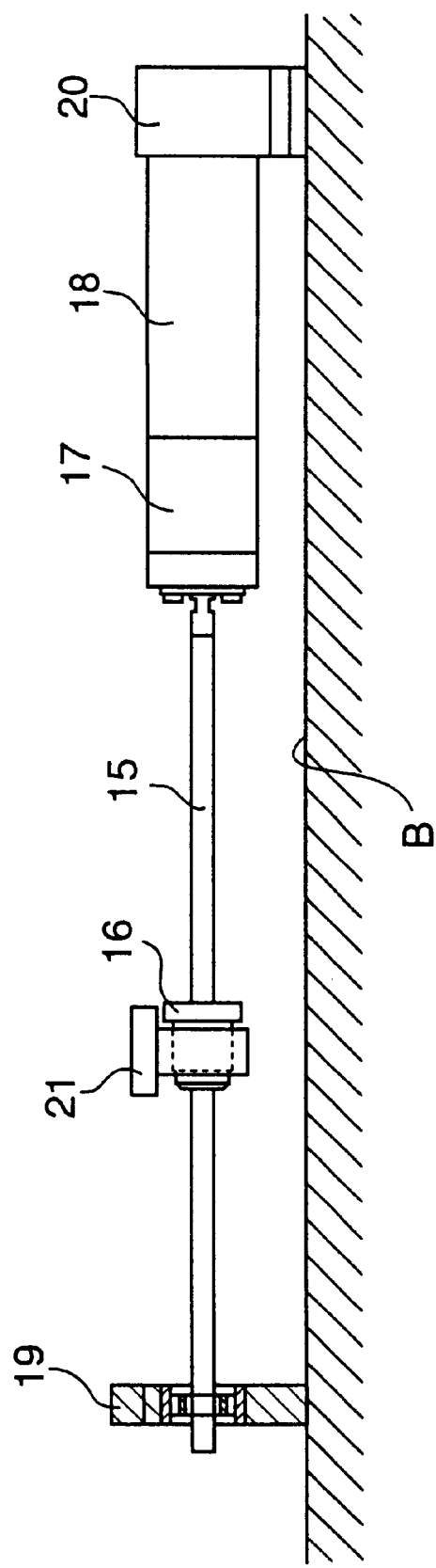
FIG. 3 is a side view showing a damping section of the base isolation device according to the 1st embodiment.

On the other hand, FIG. 3 is a perspective view showing the damping section 1b. The damping section 1b comprises a screw shaft 15 arranged parallel to the 2nd track rail 12 and rotatively supported on the basement B, a nut member 16 meshing with the screw shaft 15 and fixed to the 2nd slide member 13, and a damping rod 18 connected to one end of the screw shaft 15 through a shaft coupling 17. In an outer periphery face of the screw shaft 15, a spiral ball rolling groove is formed with a predetermined lead, and the nut member 16 meshes with the screw shaft 15 through many balls circulating endlessly. Accordingly, the nut member 16 is adapted so as to be spirally movable around the screw shaft 15 with a very small dynamic frictional resistance. Further, one end of the screw shaft 15 is rotatively supported by a bracket 19 uprightly provided on the basement B, the other end of the same is supported by a bracket 20 uprightly provided also on the basement B through the shaft coupling 17 and the damping rod 18. On the other hand, the nut member 16 is fixed to the 2nd slide member 13 through a connection bracket 21, and constituted such that, if the 2nd slide member 13 is moved along the 2nd track rail 12, it is moved accompanying with this in an axis direction of the screw shaft 15. Since the nut member 16 is held by the connection bracket 21 so as not to be rotatable, if the nut member 16 is moved together with the 2nd slide member 13 in this manner, it becomes a result that a rotary torque is given to the screw shaft 15 by the nut member 16, so that a rotation amount complying with a movement amount of the 2nd slide member 13 is generated in the screw shaft 15. That is, in this embodiment 1, the screw shaft 15 corresponds to a rotation transmission body in the invention.

Figure 4:
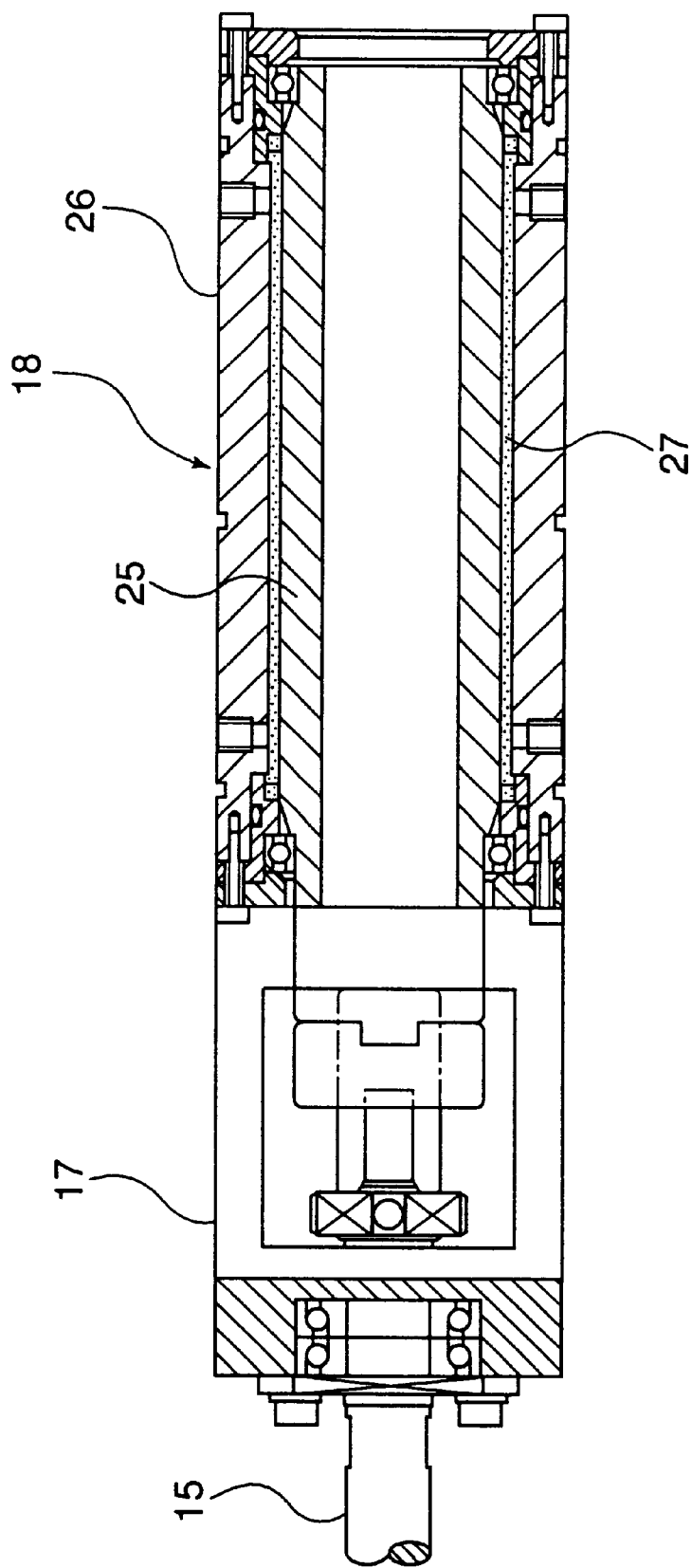
FIG. 4 is a sectional view showing a damping rod provided in the damping section according to the 1st embodiment.

On the other hand, FIG. 4 shows details of the damping rod 18. The damping rod 18 comprises a rotary sleeve 25 connected to the screw shaft 15 through the shaft coupling 17, and a stationary sleeve 26 rotatively holding the rotary sleeve 25 and fixed to the bracket 20 uprightly provided on the basement B, and the rotary sleeve 25 is accommodated in a hollow portion of the stationary sleeve 26. A slight gap is provided between an outer periphery face of the rotary sleeve 25 and an inner periphery face of the stationary sleeve 26, and a viscous fluid 27 is filled in the gap. Accordingly, it is adapted such that, if the rotary sleeve 25 is rotated with respect to the stationary sleeve 26, a shearing frictional force is applied to the viscous fluid 27, so that a kinetic energy of the rotary sleeve 25 is converted into a thermal energy of the viscous fluid 27 and thus consumed, thereby enabling to damp the kinetic energy of the rotary sleeve 25. In other words, a gap filled with the viscous fluid 27 between the rotary sleeve 25 and the stationary sleeve 26 corresponds to an action chamber of damping force in the invention.

Since the rotary sleeve 25 is connected to the screw shaft 15 through the shaft coupling 17, it follows that the damping rod 18 damps a rotary motion of the screw shaft 15 and, further, since the rotary motion of the screw shaft 15 is one obtained by converting a linear motion of the 2nd slide member 13 on the 2nd track rail 12, it follows that the damping rod 18 damps the energy of the linear motion of the 2nd slide member 13. That is, in the base isolation device 1, if the 2nd slide member 13 performs a linear reciprocation motion on the 2nd track rail 12, its kinetic energy is converted into an energy of the rotary motion of the screw shaft 15 and, thereafter, damped by the viscous fluid 27 in the damping rod 18.

FIG. 5 shows an example in which the structure body A is supported on the basement B by using the base isolation devices to which the invention was applied. In this example, the base isolation devices 1-1, 1-2, 1-3, 1-4 are disposed in four places between the structure body A and the basement B and, for example, in the base isolation devices 1-1, 1-3 a moving direction of the 2nd slide member agrees with the X-direction, and in the base isolation devices 1-2, 1-4 the moving direction of the 2nd slide member agrees with the Y-direction. And, by disposing each base isolation device in this manner and supporting the structure body A on the basement B by the support guide sections 1a, the structure body A becomes freely movable on the basement B in either of the X-direction and the Y-direction. In other words, the structure body A is under a state of being separated from the basement B and thus, even in case where the basement B is quaked by an earthquake, a quake applied to the structure body A is prevented from resonating with a quake of the basement B, so that it is possible to reduce the quake of the structure body A. Further, since the damping section 1b is connected to the 2nd slide member 13 of the support guide section 1a, if the 2nd slide member 13 is moved on the 2nd track rail 12 in the X-direction or the Y-direction with the quake of the structure body A, its motion is damped by the damping section 1b, so that the quake of the structure body A can be suppressed in short time.

Figure 6:
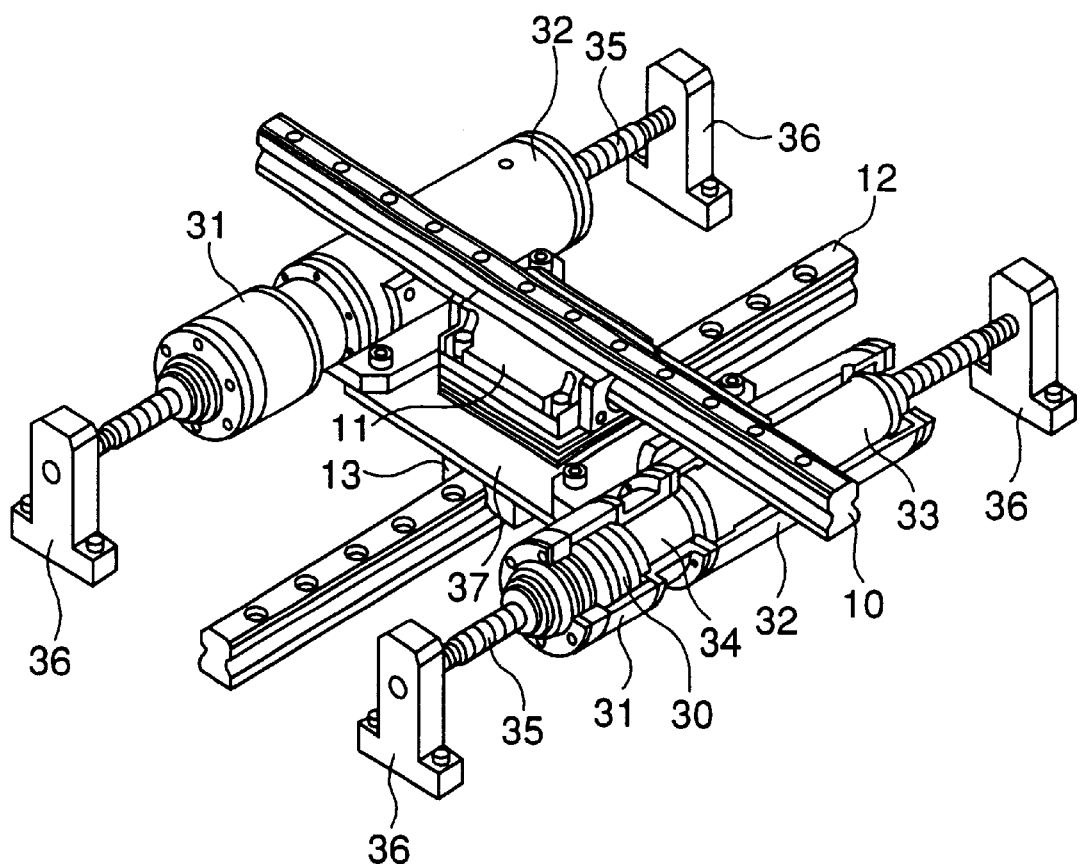
FIG. 6 is a perspective view showing a 2nd embodiment of the base isolation device to which the invention was applied.

Next, FIG. 6 shows a 2nd embodiment of the base isolation device to which the invention was applied.

Also in this 2nd embodiment, a constitution of the support guide section for supporting the structure body A on the basement B is completely the same as the embodiment 1. However, a constitution of the damping section is somewhat different. Accordingly, as to the support guide section, the same reference numerals as the embodiment 1 are affixed in FIG. 6 to thereby omit their detailed explanations, and only the damping section is explained.

In the dam ping section 1b of the 1st embodiment if the nut member 16 is moved together with the 2nd slide member 13, a rotation is given to the screw shaft 15 with such a movement, but in a damping section 1c of the 2nd embodiment it is constituted such that a nut member 30 itself is rotated with a movement of the 2nd slide member 13. That is, the nut member 30 is rotatively accommodated through a rotary bearing inside a cylindrical casing 31 fixed to the 2nd slide member 13, and the nut member 30 and a rotary sleeve 33 of a damping rod 32 are connected by a coupling 34. A screw shaft 35 meshing with the nut member 30 is fitted in its both ends into one pair of fixing brackets 36 uprightly provided on the basement B, and arrange parallel to the 2nd track rail 12 and so as not to be rotatable. A constitution of the damping rod 32 is approximately the same as the 1st embodiment, but differs only in points that the screw shaft 35 penetrates through the rotary sleeve 33, and that it is fixed to the 2nd slide member 13 by a connection bracket 37.

And, in the damping section 1c of the 2nd embodiment constituted in this manner, if the 2nd slide member 13 is moved on the 2nd track rail 12, the nut member 30 is moved in the same direction together with the damping rod 32 and the 2nd slide member 13. On this occasion, since the screw shaft 35 meshing with the nut member 30 is provided fixedly to the basement B, it follows that the nut member 30 moving on the screw shaft 35 rotates by itself, so that a rotation amount complying with a movement amount of the 2nd slide member 13 is given to the nut member 30. And, since the rotary sleeve 33 of the damping rod 32 is connected to the nut member 30, it follows that the rotary sleeve 33 is rotated with a movement of the 2nd slide member 13, so that it follows that an energy of a linear motion of the 2nd slide member 13 is damped by the damping rod 32. In other words, also in the 2nd embodiment, if the 2nd slide member 13 performs a linear reciprocation motion on the 2nd track rail 12, its kinetic energy is converted into an energy of rotary motion and, thereafter, damped by the viscous fluid in the damping rod 32.

Since an outer diameter of the nut member is naturally lager than that of the screw shaft, a torque for rotating the nut member may be less than that for rotating the screw shaft and thus, in case where the 1st embodiment is compared with the 2nd embodiment, rather the 2nd embodiment becomes possible to efficiently convert the energy of linear motion of the 2nd slide member 13 into the energy of rotary motion. Accordingly, rather the base isolation device of the 2nd embodiment shown in FIG. 6 can more efficiently damp the energy of quake applied to the structure body A than the base isolation device of the 1st embodiment.

Next, FIG. 7 shows a 3rd embodiment of the base isolation device to which the invention was applied.

Figure 8:
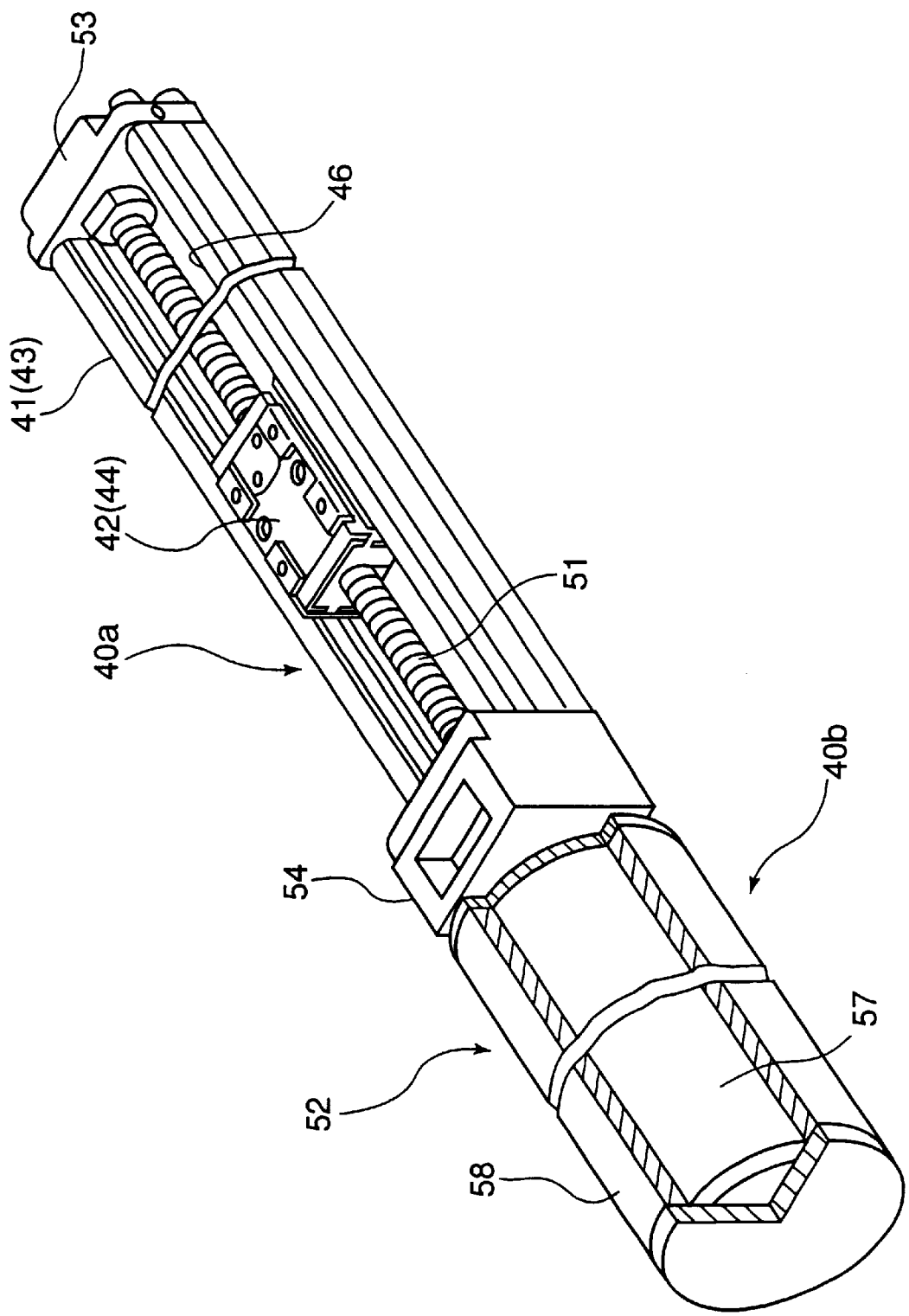
FIG. 8 is a perspective view showing a track rail and a slide member of the base isolation device according to the 3rd embodiment.
Figure 9:
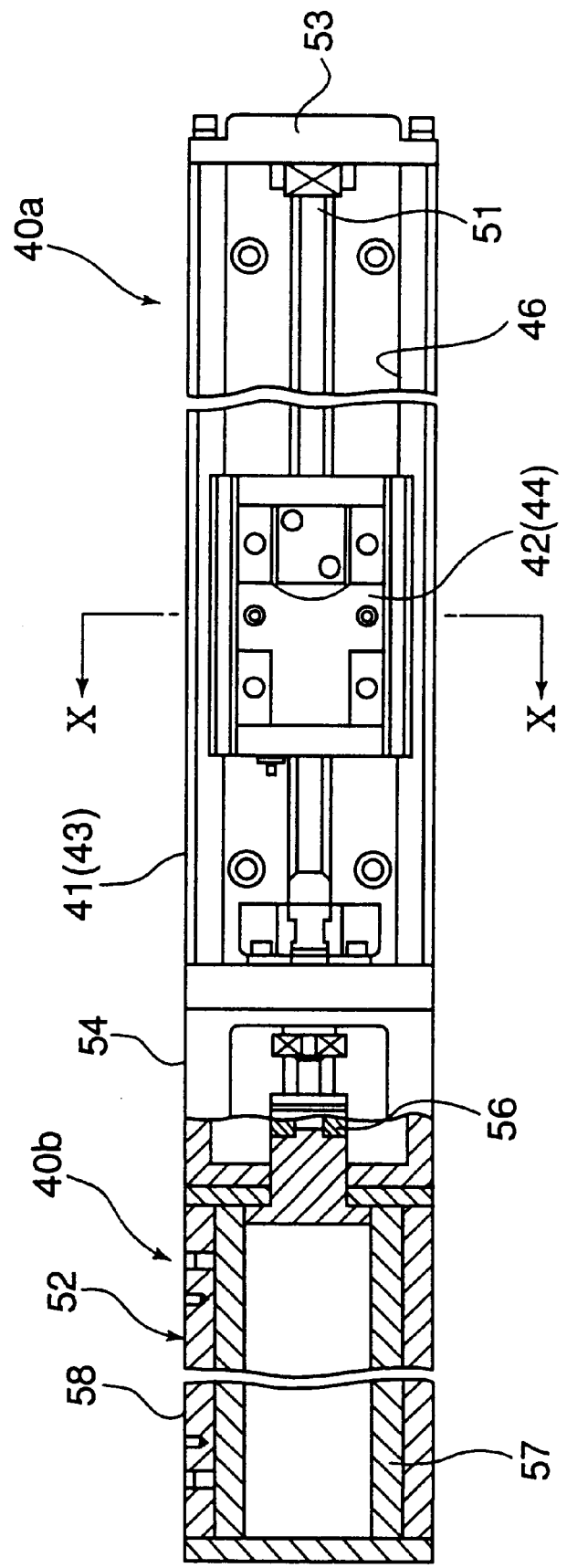
FIG. 9 is a plan view showing the track rail and the slide member of the base isolation device according to the 3rd embodiment.
Figure 10:
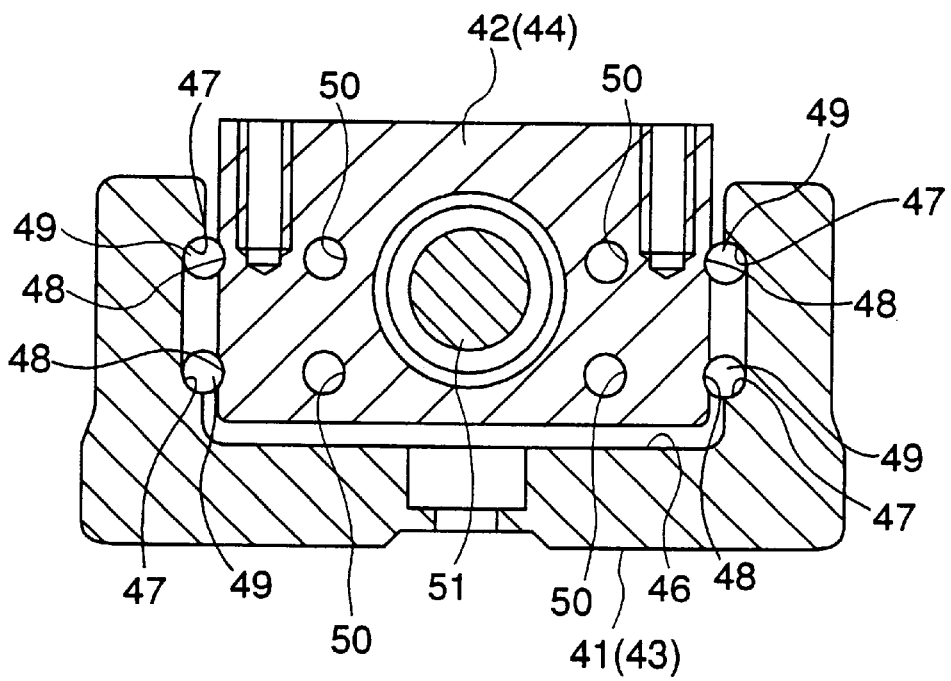
FIG. 10 is a sectional view taken along line X—X in FIG. 9.

Also this 3rd embodiment comprises a support guide section 40a for supporting the structure body A in the X- and Y-directions with respect to the basement B, and a damping section 40b for suppressing the quake of the structure body. The support guide section 40a comprises a 1st track rail 41 fixed to the basement B, a 1st slide member 42 moving along the 1st track rail 41, a 2nd track rail 43 fixed to the 1st slide member 42 so as to be orthogonal to the 1st track rail 41, and a 2nd slide member 44 moving along the 2nd track rail 43. As shown in FIG. 8 to FIG. 10, each of the track rails 41, 43 is formed in a channel form with a concave groove 46 being provided, and four ball rolling grooves 47 in total are formed in an inside face of the concave groove 46 with the two being formed per one side. On the other hand, each of the slide members 42, 44 is formed approximately in a rectangular shape, and loosely fitted in the concave groove 46 of each of the track rails 41, 43 through a slight gap. Load rolling grooves 48 facing the ball rolling grooves 47 of the track rail 41(43) are formed in both side faces of the slide member 42(44), and it is constituted such that many balls 49 roll between the load rolling grooves 48 and the ball rolling faces 47 of the track rail 41(43) while bearing a load. Further, no-load ball passages 50 for circulating the balls 49 having finished to roll in the load rolling grooves 48 are formed in the slide member 42(44). That is, the slide member 42(44) is incorporated to the track rail 41(43) through many balls 49, and it is constituted such that the slide member 42(44) is freely movable in reciprocation inside the concave groove 46 of the track rail 41(43) with a circulation of the balls 49.

Further, the damping section 40b comprises a screw shaft 51 arranged inside the concave groove 46 of the track rail 41(43), and a damping rod 52 connected to the screw shaft 51 at one end of the track rail 41(43). A support plate 53 is fixed to one end in a longitudinal direction of the track rail 41(43), while a support block 54 is fixed to the other end, and the screw shaft 51 is supported by the support plate 53 and the support block 54 so as to be rotatable and such that its axis agrees with a longitudinal direction of the track rail 41(43). Further, the support block 54 functions as a bracket for fixing the damping rod 52 to the track rail 41(43). The screw shaft 51 meshes with the slide member 42(44) through many balls, and it is adapted such that, if the slide member 42(44) is moved along the track rail 41(43) inside the concave groove 46, the screw shaft 51 is rotated in compliance with its movement amount. That is, the slide member 42(44) and the screw shaft 51 constitute a ball screw.

Figure 11:
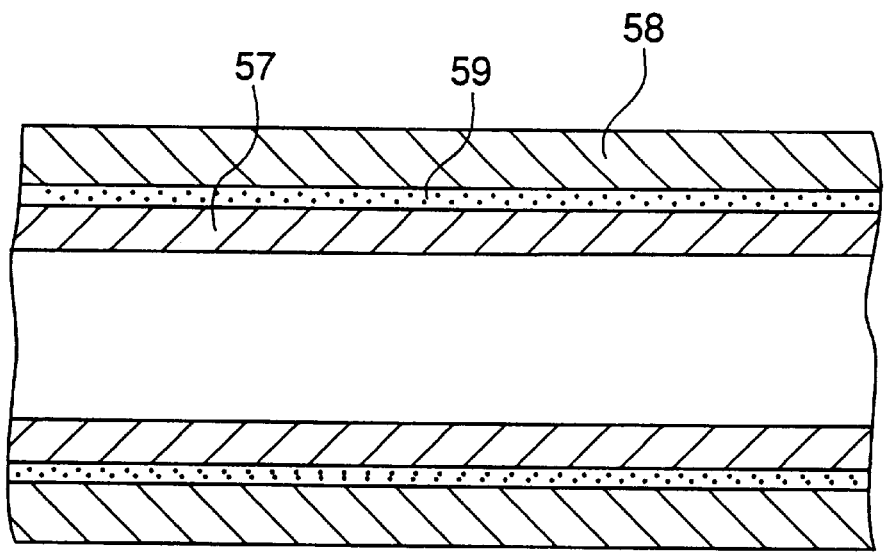
FIG. 11 is an enlarged view of a main portion of a damping rod according to the 3rd embodiment.

On the other hand, the damping rod 52 comprises, similarly to that of the 1st embodiment, a rotary sleeve 57 connected to the screw shaft 51 through a shaft coupling 56, and a stationary sleeve 58 rotatively holding the rotary sleeve 57 and fixed to the support block 54, and the rotary sleeve 57 is accommodated in a hollow portion of the stationary sleeve 58. As shown in FIG. 11, a slight gap is provided between an outer periphery face of the rotary sleeve 57 and an inner periphery face of the stationary sleeve 58, and a viscous fluid 59 is filled in the gap. Incidentally, as the shaft coupling 56, it is preferable to use an Oldham coupling in order that a rotation of the screw shaft 51 can be surely transmitted to the rotary sleeve 57 even in case where an axis of the rotary sleeve 57 is somewhat eccentric with respect to that of the screw shaft 51.

And, in the damping section 40b of the 3rd embodiment constituted in this manner, if the slide member 42(44) is moves inside the concave groove 46 of the track rail 41(43), it follow that the screw shaft 51 meshing with the slide member 42(44) is rotated, so that a rotation amount complying with a movement amount of the slide member 42(44) is given to the screw shaft 51. And, since the rotary sleeve 57 of the damping rod 52 is connected to the screw shaft 51, it follows that the rotary sleeve 57 is rotated with a movement of the slide member 42(44), so that it follows that an energy of linear motion of the slide member 42(44) is damped by the damping rod 52. In other words, also in this 3rd embodiment, if the slide member 42(44) performs a linear reciprocation motion on the track rail 41(43), its kinetic energy is converted into an energy of rotary motion And, thereafter, damped by the viscous fluid in the damping rod 52.

Figure 12:
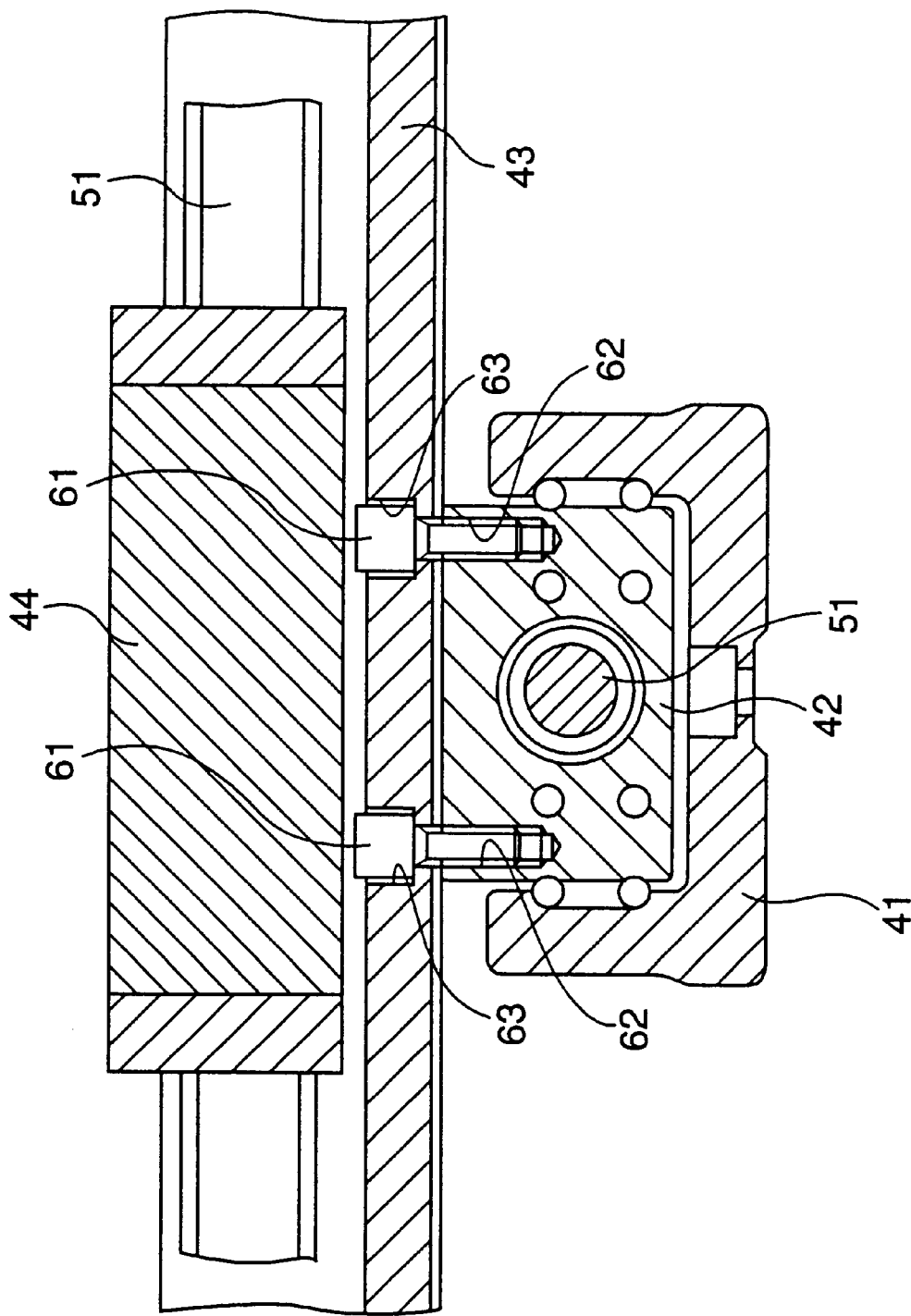
FIG. 12 is a sectional view showing fixed states of a 1st slide member and a 2nd track rail according to the 3rd embodiment.

FIG. 12 shows a fixed state between the 1st slide member 42 and the 2nd track rail 43. Tap holes 62 meshing with fixing bolts 61 are formed in an upper face of the 1st slide member 42, while through-holes 63 for inserting the fixing bolts 61 are formed in a bottom face of the 2nd track rail 43, and the 2nd track rail 43 is fixed to the 1st slide member 42 by means of screwing the fixing bolts 61 by utilizing the tap holes 62 and the through-holes 63. On this occasion, the 2nd track rail 43 is fixed such that its longitudinal direction is made orthogonal to a moving direction of the 1st slide member 42, i.e., a longitudinal direction of the 1st track rail 41. By this, when the 1st track rail 41 is fixed to the basement B and the 2nd slide member 44 is fixed to the structure body A, it become possible to freely guide the structure body A on the basement B in the X-direction and the Y-direction.

Figure 13:
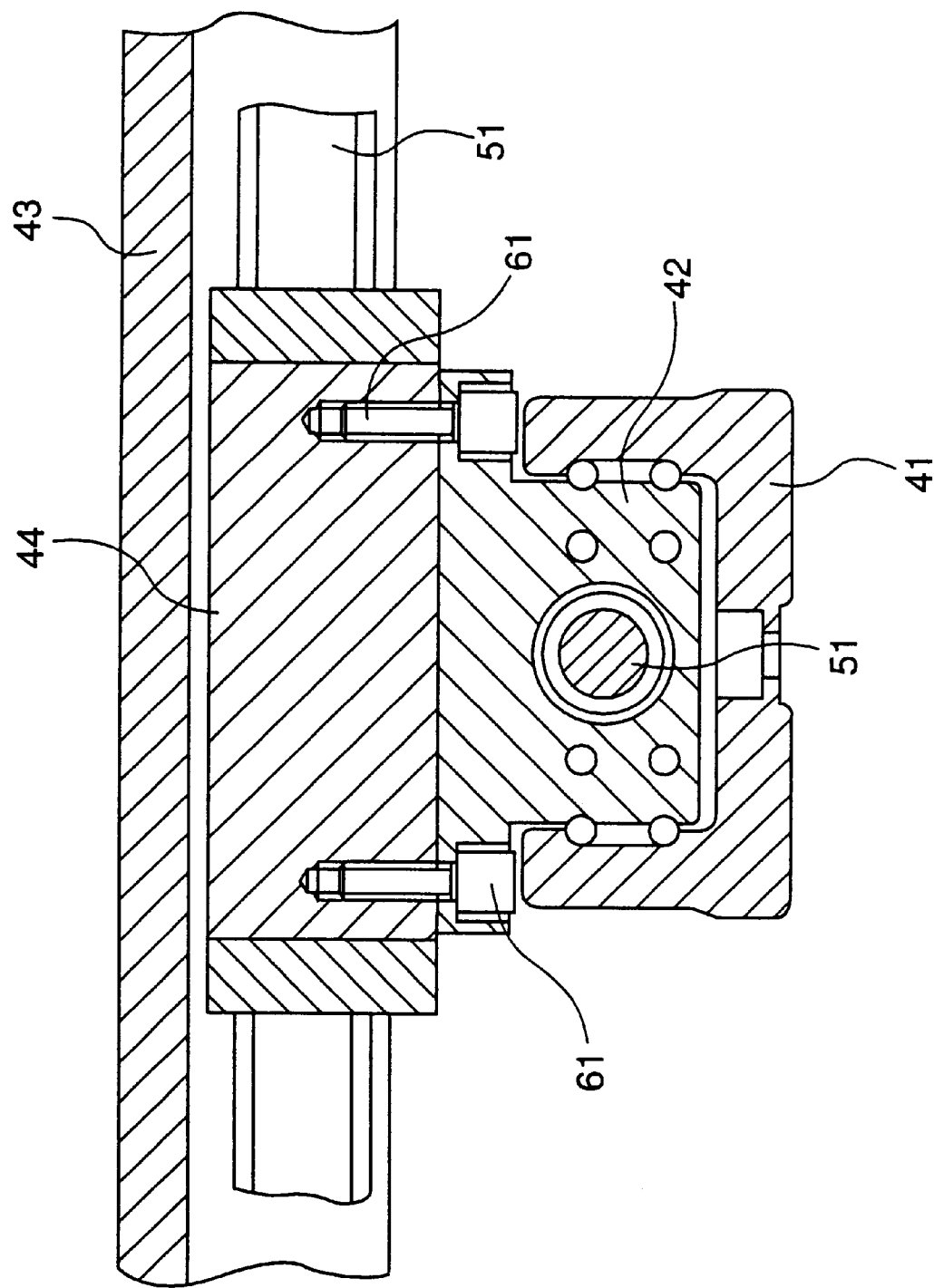
FIG. 13 is a sectional view showing an example constituting the base isolation device by fixing the 1st slide member and a 2nd slide member according to the 3rd embodiment.
Figure 14:
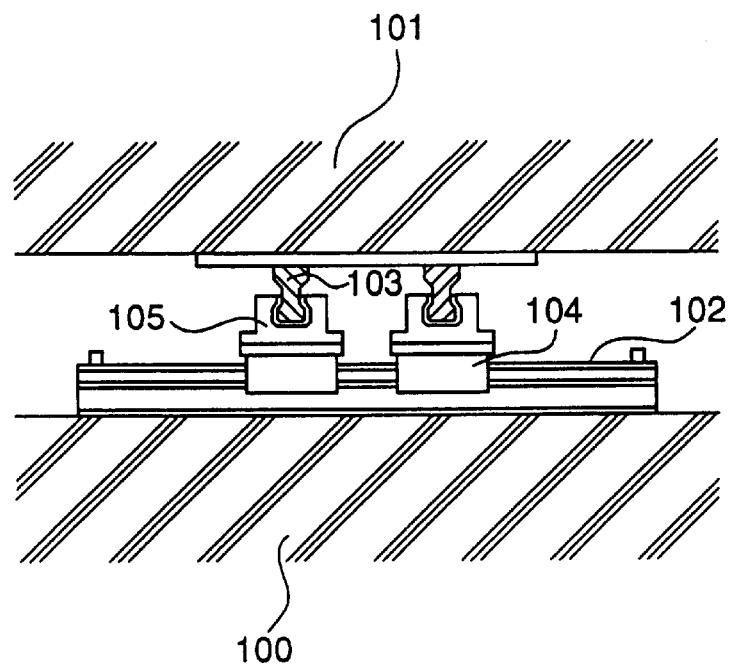
FIG. 14 is a sectional view showing a conventional base isolation device constituted by combining linear guide units.
Figure 15:
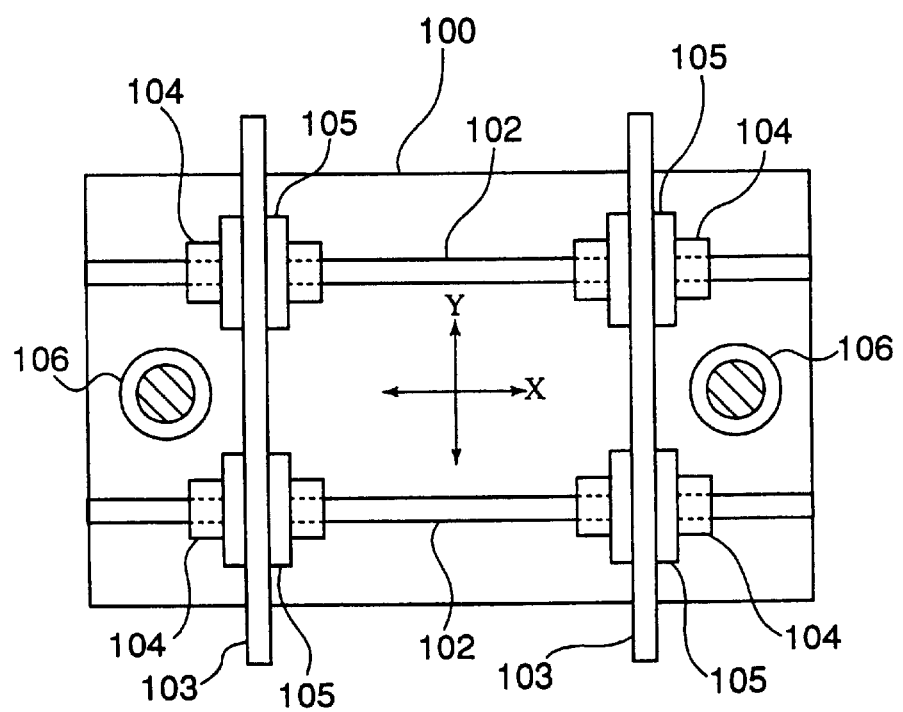
FIG. 15 is a plan view showing a use example of the conventional base isolation device.

Incidentally, in the base isolation device of the 3rd embodiment, it is not necessarily required to fix the 2nd track rail 43 to the 1st slide member 42 and, as shown in FIG. 13, it may be constituted such that the 2nd slide member 44 is fixed back to back to the 1st slide member 42, and the 2nd track rail 43 is fixed to the structure body A. Further, if the 1st slide member 42 and the 2nd slide member 44 are mutually connected in this manner, it may be constituted such that both the slide members 42, 44 are integrally formed from the beginning, and this is incorporated to the 1st track rail 41 and the 2nd track rail 43. Additionally, also as to the 1st track rail 41, it is not necessarily to fix this to the basement B, so that it may be constituted such that the 1st track rail 41 and the 2nd track rail 43 are mutually connected orthogonally and back to back and the 1st slide member 42 moving along the 1st track rail 41 is fixed to the basement B, while the 2nd slide member 44 moving along the 2nd track rail 43 is fixed to the structure body A.

And, also with respect to the base isolation device of the 3rd embodiment, by disposing the base isolation devices between the structure body A and the basement B, the structure body A becomes possible to be freely movable on the basement B in either of the X-direction and the Y-direction, so that the structure body A becomes a state of being insulated from the basement B. By this, even in case where the basement B is quaked by the earthquake, the quake applied to the structure body A is prevented from resonating with that of the basement B, so that it is possible to reduce the quake of the structure body A. Further, since the damping rod 52 is connected to the screw shaft 51 meshing with the slide member 42(44), if the slide member 42(44) is moved on the track rail 41(43) in the X-direction or the Y-direction with the quake of the structure body A, its motion is damped by the damping rod 52, so that the quake of the structure body A can be suppressed in short time.

As mentioned above, in each of the base isolation devices of the invention shown in the 1st to 3rd embodiments, since the damping section for damping the linear motion of the slide member is provided integrally with the support guide section, in case where this base isolation device is used, it is unnecessary to separately provide a damping unit, so that a labor required for arranging the device can be reduced correspondingly.

Additionally, in the base isolation device of the invention, since the linear motion between the track rail and the slide member with the earth quake is converted into a rotary motion by the screw shaft and the rotary motion is damped by being converted into a thermal energy of the viscous fluid filled between the rotary sleeve and the stationary sleeve, it is possible to deal with a great earth quake by increasing a length of the screw shaft. Moreover, since the damping section does not restrict the movement of the slide member in the support guide section at all, it becomes possible to avoid such abuses that a base isolation effect is limited by the damping section.

As explained above, according to the base isolation device with damping mechanism of the invention, since the motion conversion means connected to the slide member merely converts the linear reciprocation motion into the rotary motion, the motion of the slide member is not limited at all, so that it become possible to effectively absorb the quake of the basement by insulating the structure body from the basement. Further, since the rotary sleeve functioning as a damping unit is directly fixed to the slide member through the motion conversion means, when providing the structure body to the basement, it is unnecessary to provide the damping unit separately from the base isolation device, so that it becomes possible to intend to simplify an attaching work to the basement and the structure body correspondingly and, in turn, reduce a labor for arranging the structure body.

What is claimed is:

1. A base isolation device with damping mechanism, which is disposed between a basement and a structure body arranged on the basement and suppresses a transmission of a quake from the basement to the structure body, characterized by comprising:

1st and 2nd track rails formed with ball rolling faces along a longitudinal direction and disposed orthogonally to each other;

a 1st slide member incorporated to the 1st track rail through many balls and freely linearly movable in reciprocation along the 1st track rail;

a 2nd slide member connected to either of the 1st track rail or the 1st slide member, incorporated to the 2nd track rail through many balls and freely linearly movable in reciprocation along the 2nd track rail;

motion conversion means which has a rotation transmission body arranged such that its axis agrees with a moving direction of the 1st slide member or the 2nd slide member, and converts a linear reciprocation motion of the slide member into a normal/reverse rotary motion of the rotation transmission body;

a rotary sleeve connected to the rotation transmission body;

a stationary sleeve accommodating the rotary sleeve and forming an action chamber of damping force between it and the rotary sleeve; and a viscous fluid sealed in the action chamber.

2. A base isolation device with damping mechanism set forth in claim 1, characterized in that the motion conversion means comprises a screw shaft formed with a spiral ball rolling groove in its outer periphery face and arranged parallel to the 1st or 2nd track rail, and a nut member meshing with the screw shaft through many balls.

3. A base isolation device with damping mechanism set forth in claim 2, characterized in that the nut member moves together with the 1st or 2nd slide member, while the screw shaft is connected to the rotary sleeve as the rotation transmission body.

4. A base isolation device with damping mechanism set forth in claim 3, characterized in that the track rail is formed in a channel-like form with a concave groove being provided, the screw shaft is rotatively supported inside the concave groove, while the stationary sleeve is fixed to one end portion of the track rail with its axis agreeing with an axis of the screw shaft and, additionally, the slide member is constituted so as to accommodate the nut member and move in reciprocation inside the concave groove of the track rail.

5. A base isolation device with damping mechanism set forth in claim 2, characterized in that the nut member is supported by the slide member through a bearing and connected to the rotary sleeve as the rotation transmission body, while the screw shaft is fixed to the basement or the structure body.

6. A base isolation device with damping mechanism which is disposed between a basement and a structure body arranged on the basement and suppresses a transmission of a quake from the basement to the structure body, comprising:

1st and 2nd track rails formed with ball rolling faces along a longitudinal direction and disposed orthogonally to each other;

a 1st slide member incorporated to the 1st track rail through many balls and freely linearly movable in reciprocation along the 1st track rail;

a 2nd slide member connected to either of the 1st track rail or the 1st slide member, incorporated to the 2nd track rail through many balls and freely linearly movable in reciprocation along the 2nd track rail;

motion conversion means which has a rotation transmission body arranged such that its axis agrees with a moving direction of the 1st slide member or the 2nd slide member, and converts a linear reciprocation motion of the slide member into a normal/reverse rotary motion of the rotation transmission body;

a rotary sleeve connected to the rotation transmission body;

a stationary sleeve accommodating the rotary sleeve and forming an action chamber of damping force between it and the rotary sleeve; and a viscous fluid sealed in the action chamber, wherein the rotation transmission body penetrates through the rotary sleeve and is fixed to the 2nd slide member by a connection bracket.

7. A base isolation device with damping mechanism which is disposed between a basement and a structure body arranged on the basement and suppresses a transmission of a quake from the basement to the structure body, comprising:

1st and 2nd track rails formed with ball rolling faces along a longitudinal direction and disposed orthogonally to each other;

a 1st slide member incorporated to the 1st track rail through many balls and freely linearly movable in reciprocation along the 1st track rail;

a 2nd slide member connected to either of the 1st track rail or the 1st slide member, incorporated to the 2nd track rail through many balls and freely linearly movable in reciprocation along the 2nd track rail;

motion conversion means which has a rotation transmission body arranged such that its axis agrees with a moving direction of the 1st slide member or the 2nd slide member, and converts a linear reciprocation motion of the slide member into a normal/reverse rotary motion of the rotation transmission body;

a rotary sleeve connected to the rotation transmission body;

a stationary sleeve accommodating the rotary sleeve and forming an action chamber of damping force between it and the rotary sleeve; and a viscous fluid sealed in the action chamber, wherein the rotary sleeve is connected to the motion conversion means through a shaft coupling.

* * * * *